April 29, 1969     O. WALTZ     3,440,821
FUEL COMPONENT FEED SYSTEM FOR A LIQUID FUEL THRUST ENGINE
AND LIQUID FUEL ROCKET ENGINE CONSTRUCTION
Filed Nov. 13, 1967
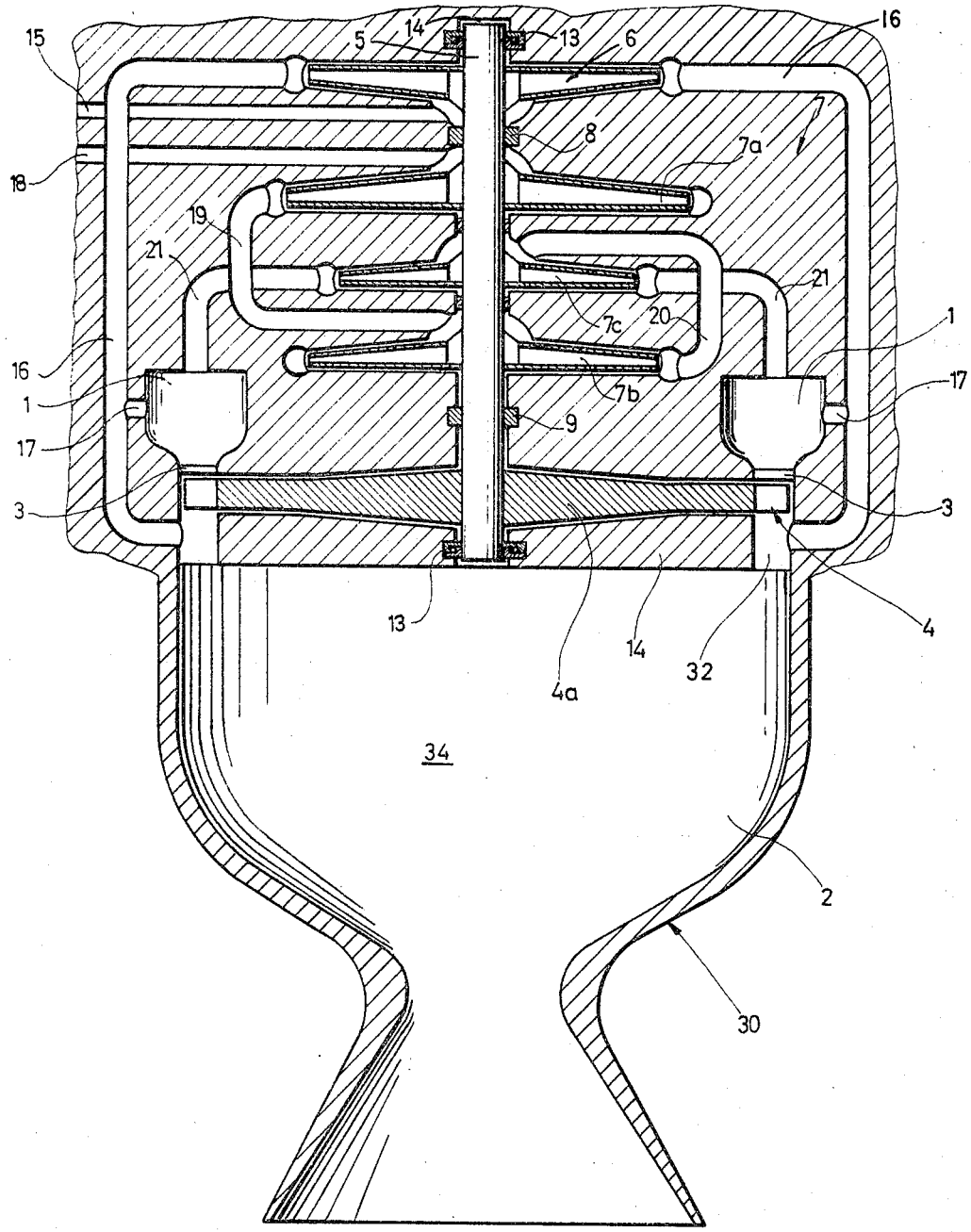
INVENTOR
Otto Waltz
By
ATTORNEYS

United States Patent Office 3,440,821
Patented Apr. 29, 1969

3,440,821
FUEL COMPONENT FEED SYSTEM FOR A LIQUID FUEL THRUST ENGINE AND LIQUID FUEL ROCKET ENGINE CONSTRUCTION
Otto Waltz, Neukirchstockach, Germany, assignor to Bolkow Gesellschaft mit beschrankter Haftung, Ottobrunn, near Munich, Germany
Continuation of application Ser. No. 495,182, Oct. 12, 1965. This application Nov. 13, 1967, Ser. No. 682,667
Claims priority, application Germany, Oct. 15, 1964, B 78,923
Int. Cl. F02k 3/12, 9/02
U.S. Cl. 60—259                              10 Claims

ABSTRACT OF THE DISCLOSURE

A fuel component feed system, particularly for a liquid fuel thrust engine such as a rocket, includes at least two separate pumps for two separate fuel components which are mounted on a common shaft along with a driving turbine. The turbine is powered by reaction gases ignited in small pre-combustion chambers adjacent the periphery of a turbine wheel which is mounted on the same shaft as the pumps. The turbine wheel drives the pumps which include an oxidizer pump for supplying an oxidizing material to the combustion chamber and to the small pre-combustion chambers. In addition, a further fuel component pump is arranged between the oxidizer pump and the turbine and it is a multi-stage pump. The fuel discharged by the multi-stage fuel pump is directed directly into the pre-combustion chambers for initial ignition in the pre-combustion chambers and for later flow into the main combustion chamber along with the oxidizer. The multi-stage fuel pump which is located between the oxidizer pump and the turbine is arranged such that the stages thereof operate so that there will be a minimum pressure differential between the fuel pump and the turbine and a minimum pressure differential between the fuel pump and the oxidizer pump.

SUMMARY OF THE INVENTION

This application is a continuation of Ser. No. 495,182, filed Oct. 12, 1965, now abandoned.

This invention relates in general to the construction of rocket engines, and in particular to a new and useful rocket engine construction having rotary pumps for supplying the fuel components which are driven by a turbine operated by the combustion gases and wherein at least two fuel component pumps are arranged on a common shaft with the turbine in an arrangement such that the pressure differentials between the various pumps and the turbine and an adjacent pump is maintained at a minimum value.

The present invention is particularly concerned with a rocket engine of a type in which the pumps for supplying the fuel components operate at distinct pressures or are divided into a number of pressure stages. Prior to the present invention pumps of this nature were arranged on the shaft in the same order as the operating pressures which they handled. With the prior art constructions a significant pressure differential between the individual feed pumps will be present. Due to such a pressure differential the sealing of the packings around the common shaft between the pumps or between the pumps and the turbine is subjected to great stresses.

In order to obtain sufficient durability and operational safety for the packings and seals, they have to be specially constructed in a cumbersome and expensive manner so that the constructional length and weight of the arrangement is increased considerably. It is naturally desirable, however, that a liquid fuel rocket motor be as light in weight as possible, and for this reason the prior art propellant fuels or constituent feed arrangements are unsatisfactory.

In accordance with the present invention there is provided a rocket combustion device which provides for a fuel constituent or propellant feed arrangement for a liquid fuel rocket engine in which the pumps are arranged such that a maximum of operational safety and life of the protective seals is maintained. A further advantage is that the feed arrangement can be produced with a minimum of technical and constructional expenditure.

In accordance with the preferred embodiment of the invention, the rocket combustion engine includes a main combustion chamber having one or more small pre-combustion chambers arranged to discharge combustion gases thereinto. The small combustion chambers are arranged to generate and discharge combustion gases to drive a turbine which is affixed to a shaft having a multi-stage pump and one or more additional pumps. The pumps are arranged in respect to the turbine such that there is a minimum operational pressure difference between each pump and between the pump and the turbine. This is accomplished by arranging the stages so that successive pumps along the shaft operate in a pressure range which is reduced from one pump to the other. In this manner, adjacent pumps are arranged so that there is a minimum pressure difference therebetween which must be sealed by sealing means arranged on the shaft. The construction is such that the pressure gradients are almost compensated, and in any event significant pressure differentials do not occur. Such an arrangement prevents high pressure forces which act on the packings or seals so that the packings can be constructed in a much more simple manner and still have sufficient operational safety factors because they are not subjected to high pressure forces.

A further advantage of the inventive construction in respect to the use of a multi-stage pump for supplying a fuel constituent is that it may operate with a pressure which corresponds to the gap pressure of the driving turbine therefor. Thus, the invention not only results in a simpler construction of the seals and in an increase of the life of the seals, but also makes it possible to insure that unintended ignition caused by friction or other reasons is caused in the areas having small amounts of propellant component leakage. In addition, the constructional length of the device can be considerably shortened, and thus a saving in weight of the engine is accomplished.

By arranging a construction between pump stages and the driving turbine such that a minimum pressure differential prevails, there is a further reduction of the load on the packings between the individual machines. This is true because the maximum load acting on the packing is determined not only by the pressure differential, but also by the absoulte magnitude or height of the pressure. Thus, when operating at very high pressures, a difference between the two pressures of adjacent pumps or pump stages produces a high pressure differential and a high loading of the packing.

Accordingly, it is an object of the invention to provide an improved liquid fuel rocket engine construction.

A further object of the invention is to provide a liquid fuel rocket construction which includes pump means for supplying fuel components which includes at least one multi-stage pump driven by a turbine and wherein the turbine and pump are arranged such that there is a minimum pressure differential between the turbine and an adjacent pump and between the various pumps.

A further object of the invention is to provide a rocket engine construction which includes one or more small precombustion chambers arranged to discharge into a main combustion chamber and in so doing to drive a gas turbine, and wherein a plurality of pumps is affixed to the same shaft as the gas turbine and arranged to deliver fuel components to the combustion chambers as various pressures, the pumps and the turbine being arranged so that there is a minimum pressure differential therebetween.

A further object of the invention is to provide a liquid fuel rocket engine which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The only figure of the drawing is a somewhat schematic longitudinal sectional view of a liquid fuel rocket engine combustion chamber constructed in accordance with the invention.

Referring to the drawing in particular, the invention embodied therein comprises a liquid fuel rocket combustion engine generally designated 30 having a plurality of pre-combustion chambers 1 defined at the inner end thereof in which there occurs a partial combustion for example under excess of fuel. The combustion gases which are generated in the pre-combustion chambers 1 exit therefrom through a passage 3 having a guide means therein and impinge on a turbine 4 to rotate a turbine wheel 4a with a shaft 5 to which it is affixed. Gases discharged by the turbine 4 are directed through a passageway 32 into a main combustion chamber 34. In the main combustion chamber these gases are burned with the additional admixture of an oxidizer.

In accordance with the invention, the turbine 4 is arranged to drive pumps generally designated 6 and 7, which have rotating pump elements which are affixed to the same shaft 5 as the turbine 4. In the embodiment illustrated, the pump 6 is an oxidizer pump and supplies oxidizer component by rotation of pump element 6a through passageways 16 and 17 of the pre-combustion chamber 1.

The pump 7 is a fuel pump and is a multi-stage pump and, in the embodiment illustrated, has three separate rotatable elements 7a, 7b, and 7c in separate respective stages. The rotating elements 7a, 7b, and 7c are affixed to the shaft 5 for rotation therewith. The elements 7a, 7b and 7c are arranged in order such that the suction side of the lowermost stage with element 7a is opposite to the suction side of the oxidizer pump 6 to that there is a minimum of pressure differential or no pressure differential between the elements 6a and 7a of the separate pumps and between each rotatable element 7a and 7c and 7c and 7b. A packing or seal 8 which is arranged between the pumps 6 and 7 is subject to a minimum pressure differential on each side thereof so that it operates under most favorable conditions. Thus, in order to obtain a satisfactory sealing, a packing of very simple and ordinary construction will be sufficient.

The pump element 7b is located adjacent the turbine 4 and the operating pressure of this pump stage is substantially equal to or silghtly less than the pressure of the turbine. Thus, there prevails also along the shaft 5 between the turbine and the pump 7 a minimum pressure drop, and thus a relatively simple sealing or packing element 9 may be employed therebetween around the shaft 5. Thus, the sealing 9 is not subjected to any stresses or loads resulting from pressure difference.

In those instances where an exact adaptation of the pressure of the pump stage 7b to the gap pressure turbine 4 should not be possible, then it is possible that a pressure drop does occur acting toward the turbine 4. The arrangement has the advantage, however, that upon occurrence of leakage losses no hot combustion gases can reach into the fuel pump which may cause the destruction of the engine due to an acute explosion. With the inventive arrangement any leakage fuel will be directed toward the turbine where the fuel, however, will burn without any spontaneous reaction.

The third rotating element 7c of the third stage of the pump 7 is arranged between the elements 7a and 7b. Specially constructed seals between the various stages of the pump 7 are not required, but ordinary seals can be used and they are usually employed in centrifugal pumps.

The shaft 5 is rotatably mounted at each end by means of bearings 13, 13. The pump 6 takes suction through a suction line 15 which is connected at its opposite end to a tank or supply (not shown). The oxidizer which is supplied through the conduit 16 will flow to the main combustion chamber 34 but a portion thereof is tapped through the line 17 for the pre-combustion chambers 1.

The fuel pump 7 is supplied with fuel through a fuel supply line 18 from a reservoir supply (not shown). The stage 7a takes suction from the supply line 18 and discharges through the pressure line 19 to the stage 7b which, in turn, discharges through the pressure line 20 to the stage 7c. The pump stage 7c provides the required pre-chamber pressure of the fuel and supplies the fuel directly to the pre-chambers 1 through the pressure lines 21.

While a specific embodiment of the invention has been shown and described in detail to illustrate the application of the inventive principles, it will be understood that the invention may be embodied otherwise without departing from such principles.

I claim:

1. A liquid fuel rocket engine comprising a combustion chamber having an outlet passage therefrom, a gas turbine including a rotatable turbine shaft and a turbine wheel mounted on said shaft for rotation therewith and disposed in the outlet passage from said combustion chamber, said turbine having a predetermined pressure acting thereon at the turbine shaft, an oxidizer supply pump including a rotatable element is mounted on said turbine shaft, said oxidizer pump having an inlet side and an outlet side operating at different pressures, a multi-stage fuel pump disposed between said oxidizer pump and said turbine, said multi-stage pump having at least two stages and each stage having a rotatable element located on said turbine shaft, each said stage having an inlet side and an outlet side and each of said inlet and outlet sides operating at a different pressure, seal means disposed on said turbine shaft between said oxidizer pump and said fuel pump and between said fuel pump and said turbine, said oxidizer pump and the stages of said fuel pump oriented on said shaft whereby the lowest possible pressure differential is established across the seal between said oxidizer pump and said fuel pump and the lowest possible pressure differential is etablished across the seal between said fuel pump and said turbine with any pressure difference therebetween acting toward said turbine.

2. A liquid fuel rocket engine as set forth in claim 1, wherein said combustion chamber is a pre-combustion chamber, and comprising a main combustion chamber, and the outlet passage from said pre-combustion chamber arranged in communication with said man combustion chamber.

3. A liquid fuel rocket engine as set forth in claim 2, wherein conduit means extend from the outlet side of said oxidizer pump to said pre-combustion chamber and to the passageway between said pre-combustion chamber and said main combustion chamber.

4. A liquid fuel rocket engine as set forth in claim 3, wherein a conduit extends from the last stage of said fuel pump to said pre-combustion chamber.

5. A liquid fuel rocket engine as set forth in claim 4, wherein the inlet side of said oxidizer pump and the inlet side of the first stage of said fuel pump are disposed adjacent said seal means between said oxidizer pump and said fuel pump.

6. A liquid fuel rocket engine as set forth in claim 5, wherein said fuel pump is at least a three-stage pump and the final stage thereof is disposed intermediate the other stages on said turbine shaft.

7. A liquid fuel rocket engine as set forth in claim 6, wherein said fuel pump is a three-stage pump and the intermediate stage thereof is located adjacent said seal means between said fuel pump and said turbine.

8. A liquid fuel rocket engine as set forth in claim 7, wherein the outlet side of said intermediate stage of said fuel pump is disposed adjacent said seal means between said fuel pump and said turbine pump.

9. A liquid fuel rocket engine comprising a main combustion chamber, at least one pre-combustion chamber having an outlet passage therefrom connected to said main combustion chamber, a gas turbine including a rotatable turbine shaft and a turbine wheel mounted on said shaft for rotation therewith, said turbine wheel disposed in the passage between said pre-combustion chamber and said main chamber, said turbine having a predetermined pressure acting thereon at the turbine shaft, an oxidizer supply pump including a rotatable element mounted on said turbine shaft, said oxidizer pump having an inlet side operating at a first pressure and an outlet side operating at a second higher pressure, a multi-stage fuel pump disposed between said oxidizer pump and said turbine, said multi-stage pump having at least a first stage and a second stage and said first stage and second stage each having a rotatable element located on said turbine shaft, said first stage and said second stage each having an inlet side operating at a first pressure and an outlet side operating at a second higher pressure and the inlet and outlet sides of said second stage operating at higher pressures than the corresponding inlet and outlet sides of said first stage, seal means disposed on said turbine shaft between said oxidizer pump and said fuel pump and between said fuel pump and said turbine, one of the pressures acting on the inlet and outlet sides of said oxidizer pump being closer to one of the pressures acting in the first and second stages of said fuel pump than the other pressure acting on said oxidizer pump, another of the pressures acting in the first and second stages of said fuel pump being closer to the pressure acting in said turbine at said turbine shaft than any of the other pressures within said first and second stage, and being at a pressure higher than the pressure within said turbine, said oxidizer pump and said fuel pump oriented on said turbine shaft whereby the side of said oxidizer pump and the side of the stage in said fuel pump having the lowest pressure differential being disposed on opposite sides of the seal between said oxidizer pump and said fuel pump, and the side of the stage of said fuel pump being closer to and higher than the pressure within the turbine arranged on the opposite side of said seal separating said fuel pump and said turbine from said turbine whereby the lowest possible pressure differential is established between said oxidizer pump and said fuel pump and between said fuel pump and said turbine.

10. A liquid fuel rocket engine comprising means defining a main combustion chamber, a plurality of pre-combustion chambers connected to said main combustion chamber, a gas turbine including a rotatable turbine shaft, a turbine wheel affixed to said shaft for rotation therewith and being arranged between said pre-combustion chamber and said main combustion chamber, an oxidizer supply pump including a rotatable element mounted on said turbine shaft and rotatable therewith, a fuel pump including a plurality of stages each having a rotatable element on said turbine shaft and located between said oxidizer supply pump and said turbine, passage means connecting said fuel pump to said pre-combustion chamber for supplying fuel to said precombustion chamber, passage means connecting said oxidizer pump to said pre-combustion chamber and said main combustion chamber, said oxidizer pump and said fuel pump and said turbine being constructed and arranged along said shaft such that there is a minimum of pressure differential between said oxidizer pump and said fuel pump, and said fuel pump and said turbine wheel, said fuel pump comprising three separate stages: an initial suction stage, an intermediate stage, and a high pressure stage, said initial suction stage being arranged on said turbine shaft adjacent said oxidizer pump, said intermediate stage being arranged on said turbine shaft adjacent said turbine wheel, and said high pressure stage being arranged between said intermediate stage and said suction stage on said turbine shaft.

References Cited

UNITED STATES PATENTS

| | | | |
|---|---|---|---|
| 2,700,935 | 2/1955 | Teague | 103—6 |
| 2,707,919 | 5/1955 | Holzwarth | 103—87 |
| 3,216,191 | 11/1965 | Madison | 60—269 |
| 3,286,469 | 11/1966 | Atherton | 60—260 |
| 3,286,473 | 11/1966 | Cowell | 60—259 |

FOREIGN PATENTS

| | | |
|---|---|---|
| 507,029 | 6/1939 | Great Britain. |
| 1,164,753 | 3/1964 | Germany. |

MARTIN P. SCHWADRON, *Primary Examiner.*

D. HART, *Assistant Examiner.*

U.S. Cl. X.R.

60—261